United States Patent

Matsuo

[11] Patent Number: 4,540,145
[45] Date of Patent: Sep. 10, 1985

[54] REEFING SYSTEM

[75] Inventor: Jon T. Matsuo, San Diego, Calif.

[73] Assignee: The United States of America as represented by the Secretary of the Navy, Washington, D.C.

[21] Appl. No.: 644,603

[22] Filed: Aug. 27, 1984

[51] Int. Cl.³ ............................................ B64D 17/62
[52] U.S. Cl. .................................................. 244/152
[58] Field of Search ............... 244/142, 145, 146, 147, 244/149, 152

[56] References Cited

U.S. PATENT DOCUMENTS

| | | | |
|---|---|---|---|
| Re. 26,427 | 7/1968 | Jalbert | 244/142 |
| 3,049,322 | 8/1962 | Vlasic | 244/152 |
| 3,524,613 | 8/1970 | Reuter et al. | 244/142 |
| 3,525,491 | 8/1970 | Barish | 244/142 |
| 3,721,409 | 3/1973 | Matsuo et al. | 244/152 |
| 3,726,500 | 4/1973 | Bockelmann | 244/152 |
| 3,756,547 | 9/1973 | Snyder et al. | 244/152 |
| 3,945,592 | 3/1976 | Sutton | 244/152 |
| 4,065,079 | 12/1977 | Winchurch | 244/152 |
| 4,114,840 | 9/1978 | Brown | 244/152 |
| 4,399,969 | 8/1983 | Gargano | 244/145 |

*Primary Examiner*—Galen L. Barefoot
*Assistant Examiner*—Paul J. Bednar
*Attorney, Agent, or Firm*—Robert F. Beers; W. Thom Skeer

[57] ABSTRACT

A reefing system to delay the development of a parachute wing is disclosed. A single line system in conjunction with a slider and a two line system are described.

11 Claims, 8 Drawing Figures

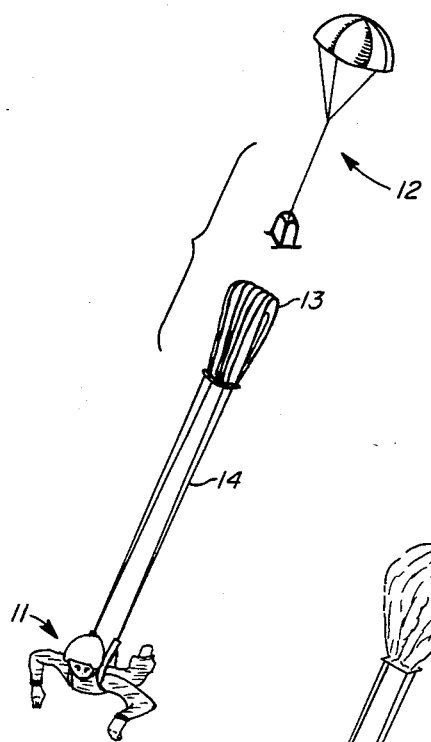
Fig. 1
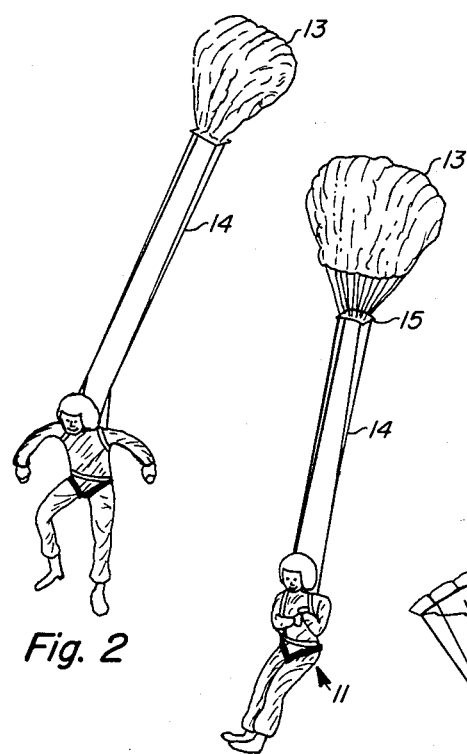
Fig. 2
Fig. 3
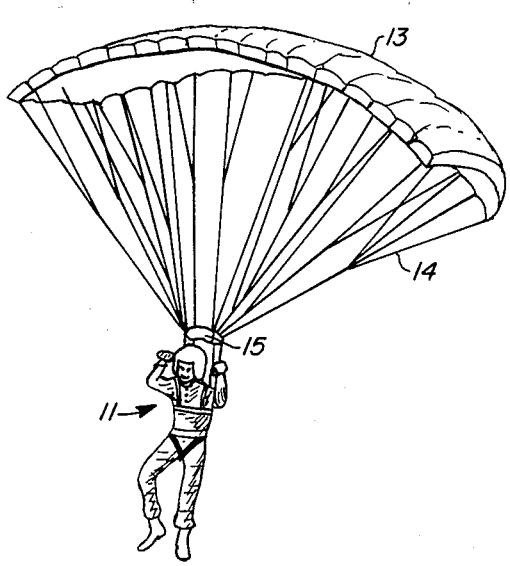
Fig. 4

REEFING SYSTEM

BACKGROUND OF THE INVENTION

1. Field of the Invention

The invention pertains to the field of aviation. In greater particularity the invention pertains to safety lowering devices of the parachute wing type. In still greater particularity, the invention pertains to opening systems for such devices. By way of further characterization, the invention will be described as it pertains to the control of high-speed deployment of a ram-air, gliding parachute wing.

2. Description of the Prior Art

Current emergency aircrew escape parachute systems have demonstrated reliable operation but still lack the capability to permit the crewman to maneuver to a favorable landing site. The 28-foot diameter, flat, circular canopy is the most common parachute used in Navy ejection seat aircraft and has recently been fitted with the four-line release modification. The four-line release system greatly reduces the oscillation of the canopy and provides for a very limited maneuverability. However, significant problems include high rate of descent; high opening shock at high speeds, and slow opening at low speeds, which requires the use of a spreader gun, a drogue gun/deployment rocket, or a combination of both with some systems. The weight of these devices causes the canopy to sink, which in addition to the long suspension lines aggravates the problem of parachute entanglement in water landings.

Ram-air types of parachute wings are known in the art but have been little used in military applications due to the high air speed associated with military applications as opposed to sport parachuting.

SUMMARY OF THE INVENTION

The invention provides a ram-air, parachute wing-type with a reefing and disreefing system which permits the parachute wing to be deployed at higher airspeeds than here-to-fore possible, thus, making this type of parachute wing acceptable in military applications. This permits the aircrew member to have far greater control of his descent than with known systems.

STATEMENT OF THE OBJECTS OF INVENTION

It is accordingly an object of this invention to provide a ram-air parachute wing suitable for military application.

A further object of the invention is to provide a disreefing system to permit ram-air parachute wings to be utilized at high air speeds.

A still further object of the present invention is to provide a ram-air type of gliding parachute wing with low opening forces at high air speeds.

Yet another object of the present invention is to provide a ram-air parchute wing with short opening times.

These and other objects will be made more clear with reference to the following description of preferred embodiments, appended claims, and attached drawings in which alike numbers indicate alike structure and in which;

BRIEF DESCRIPTION OF THE DRAWINGS

FIGS. 1-4 are sequential views of the deployment of the parachute wing of the invention;

DESCRIPTION OF THE PREFERRED EMBODIMENT

Referring to FIG. 1, an aviator 11 is shown deploying the parachute wing of the invention. As shown, a conventional drogue chute 12 has caused wing 13 to be separated from the backpack to initiate deployment. Wing 13 is supported in the conventional fashion by a plurality of support lines indicated at 14.

Referring to FIG. 2, it may be seen that the individual cells of the ram-air type parachute wing have commenced filling and the wing 13 has started to deploy. However, as yet, the parachute wing is still reefed in a tight configuration and although the individual cells are filling with ram-air, wing 13 has not commenced development. In the parachute wing art, the term deployment refers to the initial phases of parachute wing operation.

Referring to FIG. 3, it may be seen that the wing 13 has been disreefed and is starting to unfold and slider 15, conventional in the parachute wing arts, has started its sliding descent toward aviator 11.

Referring to FIG. 4, it may be seen that wing 13 has reached full development and support lines 14 have been separated to the conventional configuration. The term development is used to indicate the opening or filling process of wing 13. Slider 15 is in its lower most position where it is held by slider bumpers, not shown. This stage-wise development in which the leading edge of the ram cells have been held closed for a predetermined time interval is the characteristic operational advantage of the parachute wing according to the invention.

Figure 5:
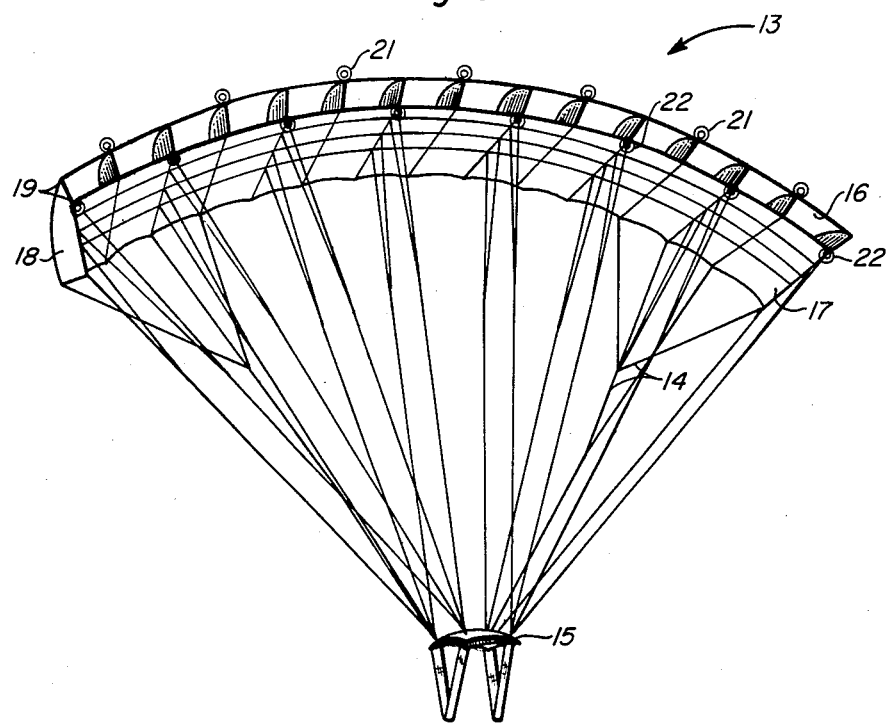
FIG. 5 is a simplified perspective view of the parachute wing according to the invention.

Referring to FIG. 5, a perspective view of a representative ram-air parachute wing of the type illustrated in FIGS. 1-4 is useful in discussing the specific construction of the inventive arrangement. As shown support line 14 extends upward and divides into a cascade line which is separated to join different portions of the lower support surface 17. The cascade lines are conventional in the parachute art and will not be described further herein. As shown, slider 15 is in its downward position. Wing 13 includes an upper surface or skin 16 and a lower support surface or skin 17. Support surfaces 16 and 17 are held in a spaced apart configuration by a plurality of ribs 18 and 20. Ribs 18 and 20 are shaped to provide an airfoil configuration between support surfaces 16 and 17 and thereby establish the airfoil shape of wing 13. Ribs are of two types, a loaded rib 18 and a nonlaoded rib 20, FIG. 6. As the name would indicate, loaded ribs 18 provide attachment points for support lines 14 on the lower support surface 17. Unloaded ribs 20 provide shape defining but do not have attachment points for the support lines. The leading and trailing edges of wing 13 are reinforced by attachment of suitable reinforcement tapes 19 on the leading and trailing edges thereof. These support tapes are conventional in the art and provide additional strength at these critical points.

A plurality of rings indicated at 21 are attached on the upper support skin 16 at the juncture of support skin 16 and nonloaded ribs 20. Rings 21 and their conventional attachment members cooperate to form a first plurality of attachment means.

Similarly, a plurality of rings 2 are attached along the leading edge of a lower support surface 17 and the load bearing ribs 18. Rings 22 and their attachment structure provide a second plurality of attachment means, to be more completely described.

Rings 21 and 22 may be fabricated of any strong material capable of withstanding the stresses which are conventional and well understood in the parachute arts. In practice, rings made of an aluminum alloy and approximately ⅜ of an inch in outside diameter have proven satisfactory. However, rings may be made of a variety of material including various plastics and metals. There are two methods for rigging the parachute according to the invention. A single stage reefing employing a single reefing line and a two stage reefing system employing two reefing lines will be described.

Figure 6:
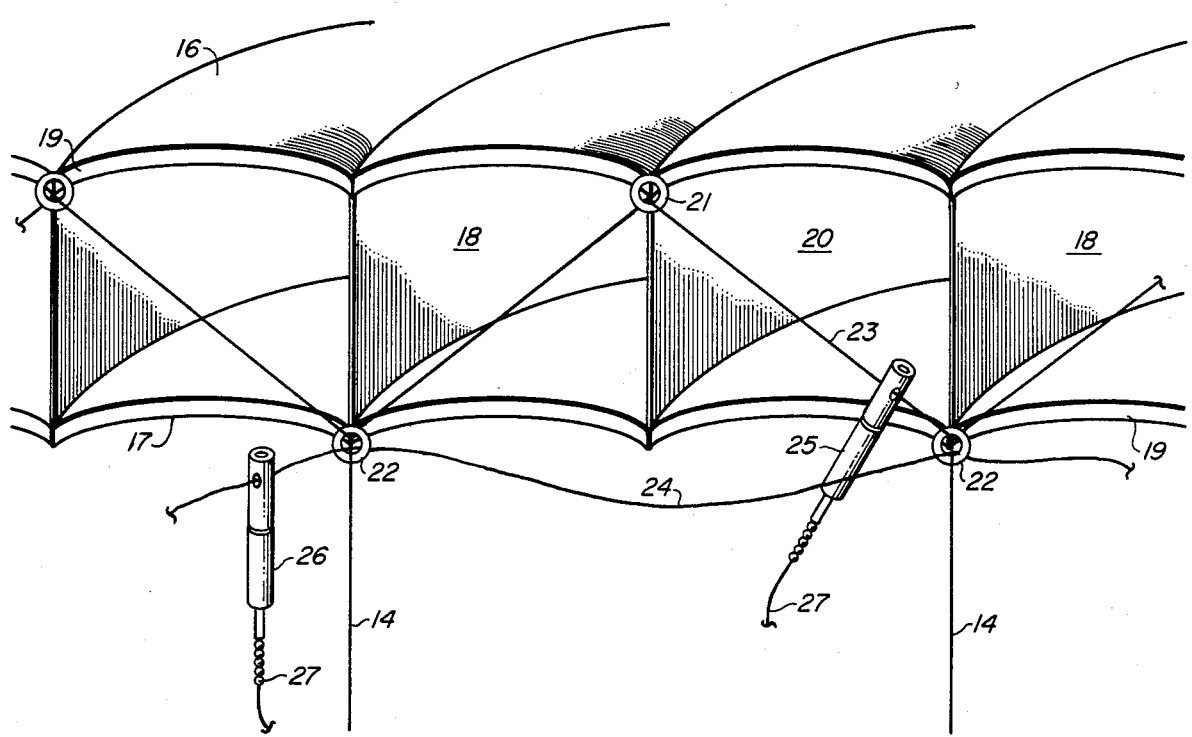
FIG. 6 is a front elevation of a portion of the parachute wing showing certain details of the reefing system.

Referring to FIG. 6, it may be seen that the separation of upper supporting surface 16 and lower supporting surface 17 by a plurality of load bearing ribs 18 and nonload bearing ribs 20 result in a cellular structure in which longitudinal sections or cells are bounded by load bearing ribs 18 and nonload bearing ribs 20. When these cells are filled with ram-air pressure due to the forward and downward movement of the parachute wing filling these cells through the leading edge openings thereof, the desired airfoil configuration is obtained. In order to control the time of filling it has been discovered that a controlled closure and opening of the leading edge is desirable. As shown in FIG. 6, a first stage reefing line 23 passes alternatively through attachment rings 21 and 22 and through cutters 25 to provide a criss-cross lacing on the leading edge of the wing 13 only. Reefing line 23 is pulled down snug so as to close these apertures until release. The second stage reefing line 24 is passed through all of the reefing rings 22, through a center reefing ring 32 two times on the slider 15 which holds slider 15 against lower surface 17 and through cutters 26.

Release is controlled by a conventional pencil line cutter, shown at 25, which is actuated by line tension on a selected one of support lines 14 by means of a conventional lanyard 27. Line cutters 25 and 26 are of the pencil line type and are conventional in the parachute arts. These cartridge actuated cutters are manufactured by Roberts Research Laboratory of Torrance, California and are pyrotechnic fuzes which fire a squib to move two concentric tubular cutters such as to sever a line passing transversely through said cylinders.

When line cutter 25 is actuated, first stage reefing line 23 is cut permitting the forward portion of the cells to open and receive the ram-air which tends to inflate them to their desired configurations. The staged inflation of wing 13 is delayed by means of a second stage reefing line 24 which passes through rings 22 and through ring 32 on slider 15 two times, and draws the periphery of the parachute wing to a closed purse-like configuration as illustrated in FIG. 2. The release of reefing line 24 is accomplished by means of a second pencil cutter 26 whose actuation cord 27 is similarly attached to a support line 14. By choosing line cutters 25 and 26 to have a different time duration of actuation, the staged opening of the parachute may be readily accomplished.

Figure 7:
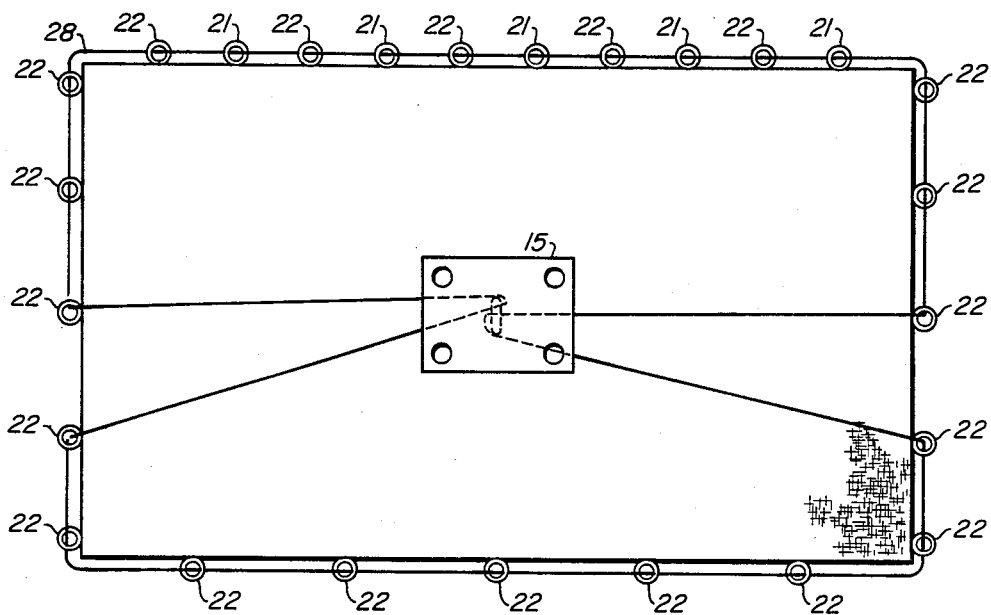
FIG. 7 is a plan view of another embodiment of the invention.

Referring to FIG. 7, an alternative arrangement using a single reefing line 28 is illustrated. In this arrangement, rings 21 are put on a plane with rings 22 and a single reefing line 28 passes through all rings and a central aperture in slider 15. When reefing line 28 is drawn tight, the opening portion of the cells is drawn closed much in the same fashion as provided by lines 23 and 24 in the embodiment of FIG. 6. As shown, line 28 also passes through a center grommet in slider 15 two times. Thus, line 28 holds slider 15 against lower surface 17 when the parachute wing is in the staged arrangement. Upon severing line 28, the cells defined by ribs 18 and 20 commence to open and the development of wing 13 is additionally slowed by the action of slider 15 moving down support lines 14. Slider 15, sometimes referred to as a sail slider, is used as a conventional sport reefing device on ram-air parachute wings. During this development, the spreading force of the wing is resisted by the slider which is held against the lower surface of the canopy by aerodynamic forces. Large grommets or D rings installed on slider 15 corners provide channels through which the suspension lines 14 are passed. During the packing, slider 15 is pulled up against lower surface 17 of wing 13 and provides the additional staged deceleration of the full development of canopy 13. In this manner, a practical two stage development is obtained with a single reefing line while at the same time holding the openings of the individual cells in a relatively closed configuration preventing their too rapid filling with ram-air.

Figure 8:
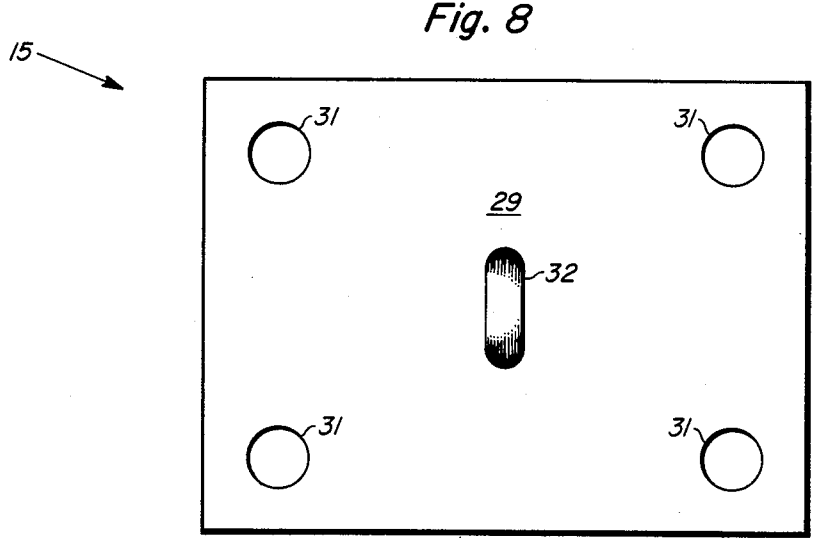
FIG. 8 is a plan view of the slider used in the invention.

FIG. 8 shows the details of the slider construction. A small panel of parachute cloth 29, of approximately 1 ×1.5 feet in dimension, has five grommets passing therethrough. Grommets 31 in each corner provide passage for support lines 14. A central aperture or passageway is provided by a ring or grommet 32. The slider, per se, is conventional in the parachute wing art and is employed in the system of the invention for its well-known purposes.

The various components of the aforedescribed parachute wing system are conventional in the parachute wing art and thus the terms rings and lines all have established meanings in those arts and are used here in the conventional sense. Likewise, a variety of alternate structures may be used as is well understood in the parachute wing art. That is, grommets may be used in place of rings with due respect to standard engineering trade-offs involving weight, strength, and bulk. Of course, a paramount design consideration in fabricating parachute wings is the reliability of operation and the proven dependability of the components.

The foregoing description taken together with the attached claims and drawings is seen to comprise a full and concise description of applicant's invention. This description is sufficient to enable one skilled in these arts to make and practice the invention which would remain unobvious to a person of such skills and not having the benefit of the teachings contained therein.

What is claimed is:

1. In a ram-air parachute wing having a canopy having an upper and a lower support surface attached to and separated by a plurality of ribs shaped to form said upper and lower wing surfaces into an airfoil configuration, an improved reefing system comprising:

a first plurality of attachment means connected to said upper support surface at spaced points about the leading edge of the parachute wing thereof;

a second plurality of attachment means connected to said lower support surface at spaced points about the periphery of the parachute wing thereof;

a first reefing line connecting individual ones of said first plurality of attachment means with individual ones of said second plurality of attachment means in a predetermined pattern;

a second reefing line connecting individual ones of said second plurality of attachment means in a predetermined pattern;

a first line cutting means connected to said first reefing line for the severing thereof at a predetermined time; and a second line cutting means connected to said second reefing line for the severing thereof at a predetermined time, whereby said parachute wing may be deployed to open in stages so as to facilitate parachute development at relatively higher airspeeds than parachute wings of a similar type bereft of such a reefing system.

2. A ram-air parachute according to claim 1 wherein said first plurality of attachment means includes a plurality of rings.

3. A ram-air parachute according to claim 1 wherein said first plurality of attachment means are spaced at the intersections of said upper support surface and predetermined ones of said ribs.

4. A ram-air parachute according to claim 2 wherein said plurality of rings are spaced at the intersections of said upper support surface and predetermined ones of said ribs.

5. A ram-air parachute according to claim 1 wherein said second plurality of attachment means includes a plurality of rings.

6. A ram-air parachute according to claim 1 wherein said second plurality of attachment means are spaced at predetermined ones of said lower support surface and said ribs intersections.

7. A ram-air parachute according to claim 5 wherein said plurality of rings are spaced to be located at the intersections of selected ones of said plurality of ribs and said lower support surface.

8. A ram-air parachute according to claim 1 wherein said first reefing line connects individual ones of said first attachment means located at the intersection of said upper support surface and a selected rib with an individual one of said second attachment means located at the intersection of said lower support surface and a rib adjacent to the rib locating said first attachment means.

9. A ram-air parachute according to claim 1 wherein said second reefing line connects all of said second attachment means.

10. A ram-air parachute according to claim 1 wherein said first line cutting means severs said first reefing line before said second line cutting means severs said second line.

11. In a ram-air parachute having an upper support surface and a lower support surface spaced apart by a plurality of ribs configured to provide a plurality of ram-air filled cells, a reefing system comprising:

a first plurality of attachment means on the periphery of said upper surface at the junction of a first series of selected ones of said ribs therewith for passing of a line therethrough;

a second plurality of attachment means on the periphery of said lower support surface and at the junction of a second series of selected ones of said ribs different than said first series for passing a line therethrough;

a slider having an attachment means thereon;

a reefing line passing through said first and second plurality of attachment means and through the attachment means on said slider and having a length to close said ram-air filled cells along said periphery and to restrain motion of said slider; and cutting means held on said reefing line and operative to sever said reefing line at a predetermined time.

* * * * *